(12) United States Patent
Bock et al.

(10) Patent No.: US 10,560,252 B2
(45) Date of Patent: Feb. 11, 2020

(54) TIME AWARE AUDIO STREAMS WITH HETEROGENOUS FRAME RATES

(71) Applicant: Intel Corporation, Santa Clara, CA (US)

(72) Inventors: Anthony S. Bock, Vancouver, WA (US); Kevin B. Stanton, Hillsboro, OR (US); Christopher S. Hall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 15/088,538

(22) Filed: Apr. 1, 2016

(65) Prior Publication Data

US 2017/0288847 A1   Oct. 5, 2017

(51) Int. Cl.
*H04L 7/00*   (2006.01)

(52) U.S. Cl.
CPC .................. *H04L 7/0012* (2013.01)

(58) Field of Classification Search
CPC ........................... H04L 7/0012; H04L 7/0087
USPC .................................................. 375/354, 355
See application file for complete search history.

(56) References Cited

U.S. PATENT DOCUMENTS

| | | | |
|---|---|---|---|
| 4,870,661 A | 9/1989 | Yamada et al. | |
| 5,875,354 A | 2/1999 | Charlton et al. | |
| 7,414,550 B1* | 8/2008 | Sudharsanan | H03H 17/0642 |
| | | | 341/118 |
| 2004/0032350 A1 | 2/2004 | Knapp et al. | |
| 2014/0044272 A1 | 2/2014 | Griesdorf et al. | |
| 2015/0244349 A1* | 8/2015 | Bendel | H03H 17/0657 |
| | | | 341/61 |
| 2015/0264136 A1 | 9/2015 | Hall et al. | |

OTHER PUBLICATIONS

PCT International Search Report, PCT Application No. PCT/US2017/015240, date of completion May 2, 2017, 3 pages.

* cited by examiner

*Primary Examiner* — Kevin M Burd
(74) *Attorney, Agent, or Firm* — International IP Law Group, P.L.L.C.

(57) ABSTRACT

An apparatus for time aware audio streams is described herein. The apparatus includes a converter and an alignment unit. The converter is to perform sample rate conversion of data from a first clock to a second clock. The alignment unit is to indicate valid sample points in the data based on a relationship between the first clock and the second clock.

25 Claims, 6 Drawing Sheets

400

TIME AWARE AUDIO STREAMS WITH HETEROGENOUS FRAME RATES

BACKGROUND ART

Audio data streams can be sourced from a variety of locations. For example, audio data may come for a file stored on an electronic device, a memory buffer, a compact disc (CD), an MP3 player, and the like. Audio data can also be sourced from network sources, via the Internet, local area networks (LANs), personal area networks (PANs), and the like. In order to render audio data from any location, the audio data is synchronized with a system clock of the system that is to render the audio data.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
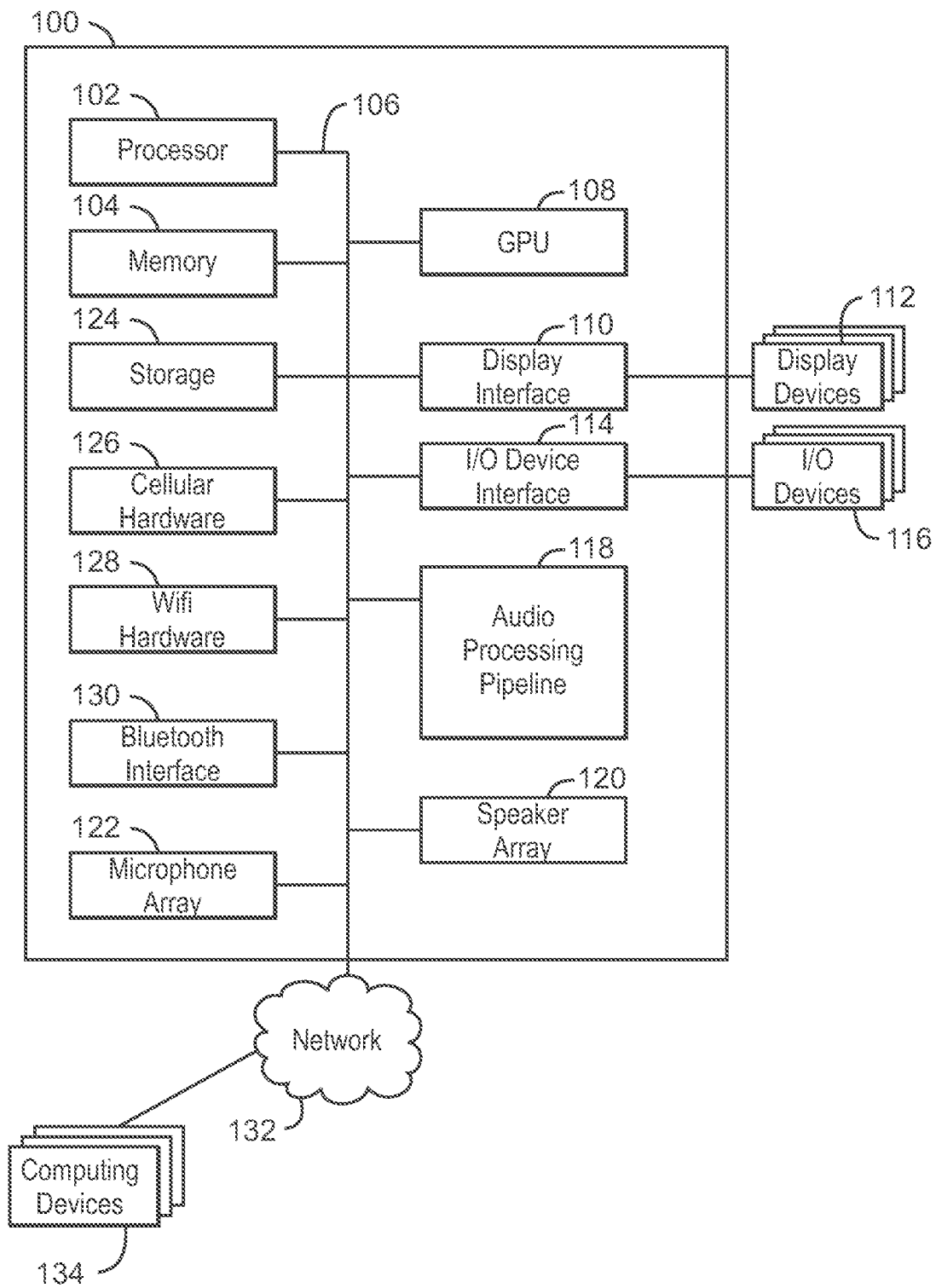
FIG. 1 is a block diagram of an exemplary system that enables accurate time aware audio streams.

Audio data may be output or captured across multiple input devices or output devices. The output or capture of audio data across multiple input devices or output devices may use a mechanism to deliver timing information for audio data streams. The timing information enables applications to accurately relate audio events to the system clock.

Audio data streams originating from various locations may be processed by an encoder/decoder (CODEC) to encode or decode the audio data stream. The CODEC may sample the audio stream at a particular frame rate. The audio digital signal processor sampling rate of the audio stream may not be related to the sampling rate of the audio digital signal processor (ADSP). Sample rate conversion is used to properly interface the audio data sampled at a first sampling rate with a system that operates at a different rate. However, even when sample rate conversion has been performed, timing uncertainty may remain.

Embodiments described herein improve the accuracy of time aware audio streams with heterogeneous frame rates. As used herein, a frame is a segment of data into which a total audio stream is divided. The frame rate may be a function of the encoding of the audio streams. In general, the audio stream may be output and/or captured when aligned with a system or master clock. In some examples, the present techniques enable an audio stream that may be output and/or captured where the outputting and/or capturing is synchronized in time across multiple devices. As used herein, heterogeneous refers to the rate of the audio clocks involved in transferring/rendering the audio data.

In examples, the alignment of audio data according to a clock may occur across multiple computing devices. For example, output of an audio stream from speakers of multiple different computing devices may be synchronized in time. Additionally, in examples, the alignment may be across multiple input and/or output devices from a single computing device. In another example, the output of an audio stream from speakers within a single computing device may be synchronized in time.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an exemplary system that enables accurate time aware audio streams. As used herein, streaming or streams refers to the real time delivery of data.

The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, streaming data, or the like, to be rendered or displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to one or more display devices 112. The display devices 112 can include a display screen that is a built-in component of the electronic device 100. In embodiments, the display interface 110 is coupled with the display devices 112 via any networking technology such as cellular hardware 126, WiFi hardware 128, or a Bluetooth Interface 130 across the network 132. The display devices 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100. Accordingly, in embodiments, the I/O device interface 114 is coupled with the I/O devices 116 via any networking technology such as cellular hardware 126, WiFi hardware 128, or a Bluetooth Interface 130 across the network 132. The I/O devices 116 can also include any I/O device that is externally connected to the electronic device 100. In embodiments, the I/O devices 116 include a plurality of speakers.

The electronic device 100 also includes an audio processing pipeline 118, and may include an audio digital signal processor. The audio processing pipeline 118 may include a series of processing elements that are to process audio data for rendering by a speaker array 120. The audio processing pipeline may also process audio captured by a microphone array 122. For example, frames of audio data may be processed by audio hardware processes at 48000 audio frames per second, resulting in a signal frequency of 48 kHz. To process this audio data, a CODEC operating in the audio processing pipeline may process audio data by sampling the data at 48000 frames per second. Various audio CODECs sample audio data at different frame rates. The encoding format of the audio stream is converted (more sample rate conversion, again) to the format expected by the CODEC. They can be the same, but there is no requirement. For example, MPEG-4 audio is processed using a different CODEC with a different sample rate than DTS-HD Master Audio. The present techniques address this difference in frequencies by determining the clock misalignment and then either accounting for the differences in clock frequencies in timing calculations or applying restrictions on when timestamp samples are taken. In embodiments, the present techniques can mitigate erroneous data samples caused when the pipeline used to move data to the CODEC uses a different frequency than the CODEC itself.

A system clock of the electronic device 100 may operate hundreds of times faster than the sample rate of the CODEC. For example, the system clock may complete 500 clock cycles per audio frame sample. With a CODEC operating at a sampling rate of 48 kHz (the same frequency of the ADSP processor), the value of the system clock may be accurately determined at the beginning of each audio frame, within approximately 41.67 nanoseconds, +/−about 21 ns, as follows:

$$\frac{1}{48000*500} = 41.67 \text{ ns}$$

In this example, an assumption is made that there a system where we conveniently assume there is a known, constant relationship between the system clock and the audio clock. This means that any misalignment between the audio and system clocks must be less than one system clock, or the relationship wouldn't be constant. Since each audio clock is 500 system clocks, then the range of misalignment is 1/500 audio clocks. This range covers the distance of up to one half of a clock early to a maximum of one half of a clock late. Thus, the misalignment may be +/−½ of a system clock.

In the present example, the measurement of the accuracy with which the system can determine the relationship between the audio stream position and the system clock to within +/−about 21 ns is an acceptable level of accuracy. Because of the small time discrepancy in the conversion, the resulting system is better able to align/process audio data with respect to the system clock than a system with a higher discrepancy. This discrepancy may be referred to as time uncertainty To obtain this accuracy, the CODEC supplying/consuming the audio must operate at frequency that is an integral multiple of the 48 kHz ADSP frequency: e.g.: 24 kHz, 48 kHz, 96 kHz, etc.

Sample rate conversion is performed so that audio data processed by the CODEC can properly interface with system hardware operating at a different sample rate. The sample rate conversion may occur when the CODEC samples at a rate other than an integral multiple of the 48 kHz ADSP frequency. The sample rate conversion also introduces timing uncertainty. As used here, timing uncertainty refers to the relationship between the audio stream position and the clock used to move audio to the CODEC. In the example above, that is the 48 kHz ADSP clock, which serves as a proxy to the system clock since an assumption is made that each ADSP clock equals 500 system clocks.

In embodiments, when the CODEC supplying/consuming the audio data to the system operates at a sample rate that is not an integral multiple of the 48 kHz ADSP frequency, the audio processing pipeline can use information about the relative positions of the CODEC and ADSP clocks to greatly reduce the timing uncertainty. Alternatively, a ratio between the ADSP and CODEC clocks can be used to determine when the clocks will align to indicate when audio samples should occur or when audio samples are valid. Additionally, in embodiments, a pattern between the ADSP and CODEC clocks may be observed such that offsets at every point in the pattern are pre-calculated, and those values can be used to populate a lookup table that can indicate when audio samples should occur or when audio samples are valid.

The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications-Advanced (IMT-Advanced) Standard promulgated by the International Telecommunications Union—Radio communication Sector (ITU-R)). In this manner, the electronic device 100 may access any network 132 without being tethered or paired to another device, where the cellular hardware 126 enables access to the network 132.

The CPU 102 may also be linked through the bus 106 to WiFi hardware 128. The WiFi hardware 128 is hardware according to WiFi standards (standards promulgated as Institute of Electrical and Electronics Engineers' (IEEE) 802.11 standards). The WiFi hardware 128 enables the electronic device 100 to connect to the Internet using the Transmission Control Protocol and the Internet Protocol (TCP/IP). Accordingly, the electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others.

The network 132 may be used to obtain streaming audio data. In embodiments, streaming audio data is synchronized with audio data that is processed by a plurality of computing devices 134. In embodiments, the plurality of computing devices may be used to implement a surround sound system. Additionally, in embodiments, the computing devices 134 include components similar to that of the electronic device 100.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

As discussed above, for cases where the CODEC supplying/consuming the audio runs at a frequency unrelated to the system clock, say 44.1 kHz, the ability of the system to accurately determine the relationship between the audio stream position and the system clock may be compromised. As used herein, unrelated refers to the lack of an integral multiplier between different frequencies and clock rates. Continuing with the above example, assume that the audio stream is encoded at 44.1 kHz. Such a system will only be able to determine the system clock value at the beginning of each audio frame, to within a range of approximately 22 μs, or +/−11 μs, to within one audio frame as follows:

$$\frac{1}{48000} = 22 \text{ μs}$$

This is 500 times less accurate than the optimal case, above. Again, the +/−½ clock refers to the fact that the misalignment can range from one half clock early up to one half clock later. The root cause of the loss in accuracy is that the clock edges of the ADSP and the audio frame rate are no longer aligned in cases requiring sample rate conversion.

Figure 2:
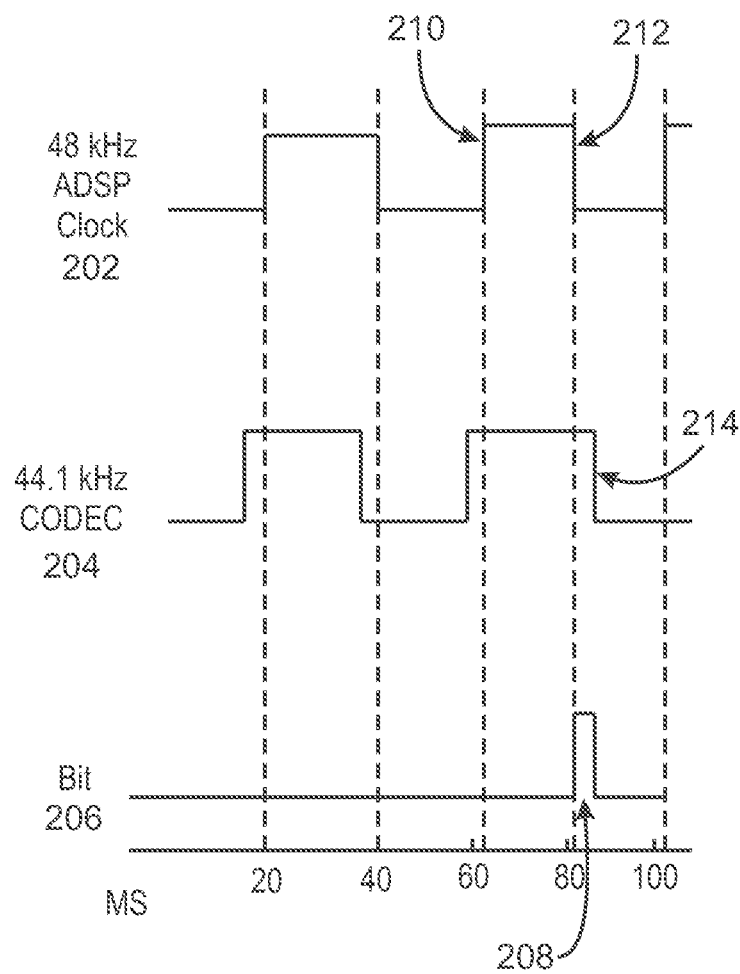
FIG. 2 is a timing diagram illustrating a system clock and a CODEC clock.

FIG. 2 is a timing diagram 200 illustrating a system clock and a CODEC clock. In FIG. 2, a reference clock 202 is illustrated with a period of T=20.83 μs, in this case the reference clock is an ADSP clock used to move data to a CODEC. The audio frame 204 is illustrated with a frequency of 44.1 h=kHz. Thus, a conversion is required to move the 44.1 kHz audio stream 204 using the 48 kHz reference clock 202. In an example, a 48 kHz ADSP clock 202 moves an audio stream encoded at 44.1 kHz 204. For ease of description, these particular clock values have been selected. However, the present techniques may be implemented with any conversion that results in clock misalignment.

Hardware such as an ADSP realizes the precise value or tick count of a clock right at the edge of the clock cycles. Ideally, the value of the clocks would be snapshot or taken at the clock edges every time a sample occurs. In the example of FIG. 2, the clock edges rarely align perfectly so the system can obtain a clean snapshot. The issue is that the timing information (snapshot of the two clocks) must be captured at one of the clock's edges, meaning that the relationship to the other clock is uncertain. In this case, the snapshot is taken on the ADSP clock edge, meaning that it is difficult for hardware to determine exactly how the 44.1 kHz clock edge relates to the 48 kHz edge used as the reference.

When sample rate conversion is performed, the present techniques can use information about the relative positions of the audio stream and ADSP clocks to greatly reduce the timing uncertainty. In particular, a bit 206 may be set to indicate that the current CODEC clock completely "straddles" the current ADSP clock. As illustrated, the current audio stream 204 completely straddles the ADSP clock 202 as indicated by reference number 208. As used herein, straddle may refer to when a period of one clock encompasses the period of a second clock. Accordingly, bit 206 is high at reference number 208.

Bit 206 can provide a hint to hardware or software that an audio sample point is accurate. In embodiments, the clock state is captured when this bit would be set so that software only sees clock samplings at the ADSP clock edges where the audio frame straddles the ADSP clock. For example, when the bit 206 is high, the clock 202 edge 212 is observed, rendering samples taken at this time valid. When bit 206 is low, the samples taken during this period are invalid. Bit 206 is low when an audio frame 204 does not encompass the entirety of a reference clock 202 period, and no samples are taken. By taking samples only when the audio frame 204 encompasses a reference clock 202 period, the sampled audio data has much improved accuracy with little additional latency.

For example, consider a 48 kHz-to-44.1 kHz conversion. Assume that the larger clock cycle encompasses the entire clock cycle (edge to edge) of the 48 kHz clock. A timestamp snapshot at the edge of that 48 kHz clock cycle is taken. The exact location of the nearest edge of the 44.1 kHz clock is not known, but it is known that the nearest edge is not anywhere inside the current 48 kHz clock cycle. Therefore, the nearest 44.1 kHz edge must be slightly after the current 48 kHz edge. It can be determined how much later the nearest edge could be by taking the duration of a 44.1 kHz cycle (~22.7 μs) and subtracting out the duration of the 48 kHz cycle (20.8 μs), where it is established the clock edge is not located. With rounding, this leaves a range of up to 1.8 μs. This means that the nearest 44.1 kHz edge must be somewhere within 1.8 μs after to the current 48 kHz edge.

In embodiments, bit 206 is driven by a reference clock, so its edges align with the 48 kHz clock 202. The bit 206 is high at the 48 kHz edge 212 and is low prior to the next 48 Khz edge at about time 100. The bit 206 will be sampled at edge 212. The two clock edges that are close is the 48 khz edge at 212 and the 44.1 kHz edge 214 slightly after the 48 khz edge at 212.

Thus, the accuracy improves as follows:

$$\frac{1}{44100} - \frac{1}{48000} = 1.8 \text{ μs}$$

or +/−0.9 us. This is a 92% improvement over current implementations.

Figure 3A:
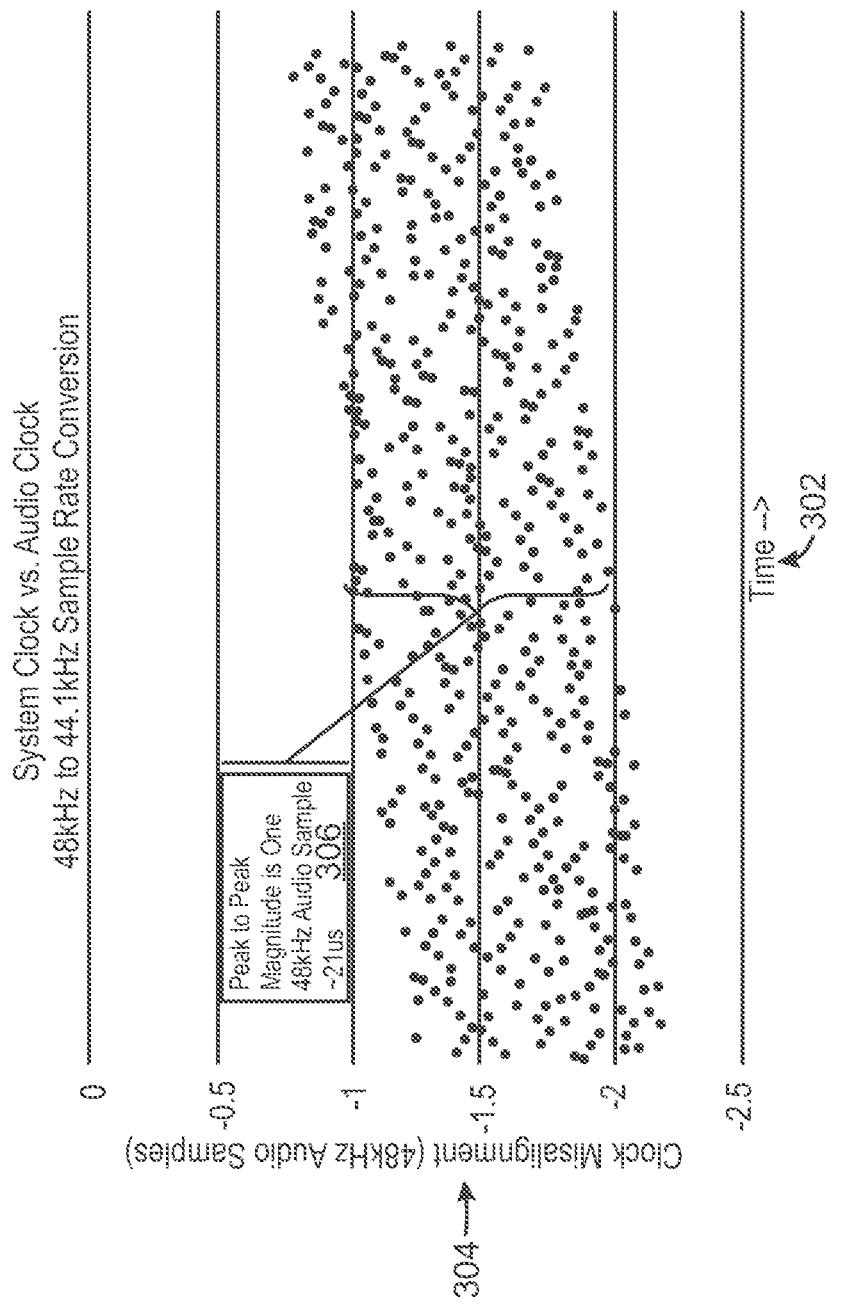
FIG. 3A is a graph illustrating data captured during sample rate conversion.

FIG. 3A is a graph 300A illustrating timestamp data captured during sample rate conversion. The x-axis 302 represents time, and the y-axis represents 48 kHz audio samples taken from the 48 kHz to 44.1 kHz audio samples. As illustrated, samples are taken at the 48 kHz clock edge. In this example, the system clock does drive the 48 kHz clock and their edges are assumed to be always aligned. The misalignment recorded at each sample is the distance between the 48 kHz edge and the 44.1 kHz edge. Currently, traditional systems are unable to account for this misalignment. At reference number 306, the peak to peak magnitude of one 48 kHz audio sample is approximately 21 μs. This represents a plurality of values for each 48 kHz audio sample.

Figure 3B:
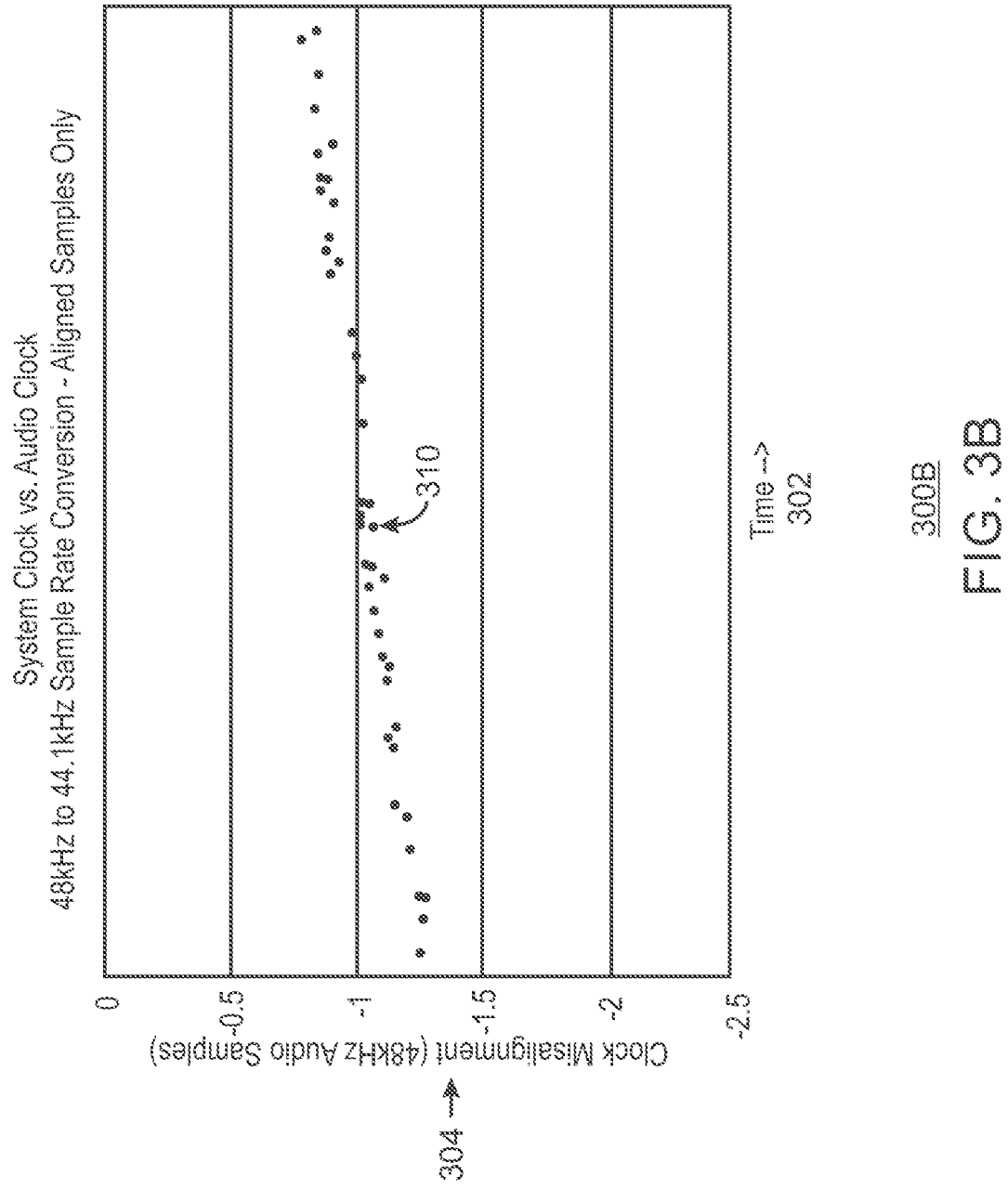
FIG. 3B is a graph illustrating data captured during sample rate conversion with clock misalignment reduction.

FIG. 3B is a graph 300 graph illustrating data captured during sample rate conversion with clock misalignment reduction. In FIG. 3B, data is captured after sample rate conversion and only where the 44.1 kHz clock is known to straddle the 48 kHz clock. That is, where bit line 206 (FIG. 2) from the earlier diagram would be high. The x-axis 302 represents time, and the y-axis represents 48 kHz audio samples taken from the 48 kHz to 44.1 kHz audio samples. As illustrated, the timestamps may be taken at the 48 kHz reference clock when it is aligned with a 44.1 kHz audio frame. The aligned samples, such as sample 310, result in more accurate samples of the relative positions of the 48 kHz reference clock and the 44.1 kHz audio frames during sample rate conversion.

As an alternative to the use of a bit indicating when samples are valid, a ratio may be used to determine when the ADSP and CODEC clocks will align. Returning again to the above example, the ratio between the 44.1 kHz CODEC clock and the 48 kHz ADSP clock is 1:0.91875, which is the ratio of the two clocks' frequencies: 147/160. The means that the clocks will align once every 160 ADSP clocks. In embodiments, the clock sampling hardware may be designed to only sample when the clocks are aligned. This effectively eliminates the timing uncertainty due to sample rate conversion at a cost of up to 3.3 ms additional latency.

Figure 4:
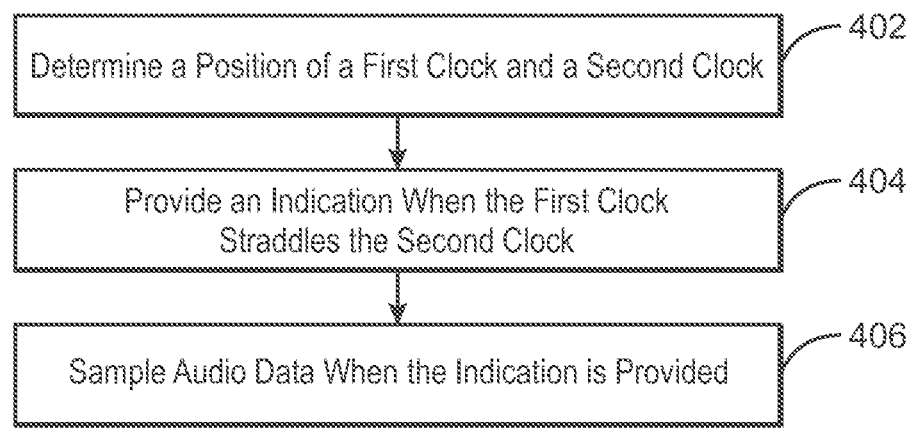
FIG. 4 is a process flow diagram of a method for accurate time aware audio streams.

FIG. 4 is a process flow diagram of a method 400 for accurate time aware audio streams. In embodiments, a mechanism is implemented delivering precision timing information for audio streams. This feature enables applications to accurately relate audio events to the system clock. In particular, the frame rate of the audio stream and the frame rate of the audio digital signal processor (ADSP) handling the stream that are not related by an integer ratio are adaptively sampled in order to enable an accurate relationship between the timing data of two clocks.

Where sample rate conversion is required, accuracy drops from +/−one half of a system clock to +/−one half of an audio frame. Typically, the system clock runs many hundreds of times faster than the audio frame rate. Therefore, this loss in accuracy is substantial. The present techniques account for the timing uncertainty introduced by sample rate conversion, eliminating the associated loss in accuracy.

Without this invention, the system is able to correlate audio frames and hardware clocks to within one system clock tick as long as the frame rates of the software stream and the audio hardware are related by an integer ratio. However, the system clock typically runs at a rate much faster than the audio frame rate. To obtain this accuracy, the encoding of the audio stream must be at frequency that is an integral multiple of the 48 kHz ADSP frequency; e.g.: 24 kHz, 48 kHz, 96 kHz, etc.

At block 402, a position of a first clock and a second clock is determined, for instance both clocks start with their edges aligned at time zero. The position of the clocks may be used to define the relationship between the two clocks. For example, audio may be rendered at 44.1 kHz, but moved through the system using a 48 kHz clock source. The transition from one clock frequency to another is what requires a sample rate conversion. Because the clocks have different frequencies, the clock edges don't exactly "line up" and it's difficult for the system to determine the exact relationship between the two at an arbitrary point. In embodiments, a relative position between the first clock and the second clock is determined. Additionally, the position of the first clock with regard to the second clock may also be defined as a ratio or as a pattern.

At block 404, an indication is provided when the first clock straddles the second clock. In embodiments, the indication is a bit that is set whenever the first clock straddles the second clock. The first clock may be a CODEC clock, and the second clock may be an ADSP clock. In embodiments, the bit may serve as a hint to applications or hardware of the electronic device that the audio data may be sampled because the drift between the two clocks is constrained to a smaller range. This results in improved accuracy with little additional latency. In embodiments, a ratio between the ADSP and CODEC clocks can be used to determine when the clocks will align to indicate when audio samples should occur.

Moreover, an indication can be provided according to a pattern between the two clocks. For example, assume the ratio of the frequencies used in a sample rate conversion is a rational number. This is the case in the above example of a 44.1 to 48 kHz conversion: 44100/48000 yields a ratio of 147:160. This means there is a repeating pattern describing the relationship between the two clocks that repeats every 160 ADSP clocks. Assume that at the beginning of a sample rate conversion, the clock edges of both clocks are perfectly aligned. In this case, when the second clock edges arrive, the edge of the slower clock will be a little bit later than the edge of the faster clock. The third clock edges will be a little further apart and so forth until finally the clocks are perfectly aligned once again at the 160th 48 kHz clock edge. At that point, exactly 147 44.1 kHz clock edges will have occurred. In embodiments, an offset at every point in the pattern is pre-calculated and those values are stored in a lookup table. For example, the table in a 44.1 to 48 kHz conversion would have 147 rows and two columns. The rows represent 44.1 kHz clock edges. The columns represent two possible states: when the current 44.1 kHz clock cycle straddles the current 48 kHz clock cycle and when the current 44.1 kHz clock cycle does not straddle the current 48 kHz clock cycle.

Put another way, the lookup table may be used to determine when a first clock (44.1 kHz) straddles a second clock (48 kHz) if the adjacent 44.1 kHz clock edges have one 48 kHz clock edge between them, or two edges. These "skips" occur infrequently and at deterministic positions. The "two edge" column will be sparsely populated. The data in the table is the distance in time from each 44.1 kHz clock edge to the nearest 48 kHz clock edge.

At runtime, the system would begin counting 44.1 kHz clock edges from the start of the operation. When a timestamp sample is taken, the system uses the current 44.1 kHz edge count (204) and the bit line (206) as illustrated in FIG. 2. The system monitors the modulus of the edge count and the number of rows in the table to determine which row to reference. The state of the bit line may be used to determine which column to use. If the bit line is not set, then the "one edge" column contains the correct data. If the bit line is high, the "two edge" column contains the correct data. In embodiments, the use of a pattern and lookup table is both quick and accurate.

At block 406, audio timestamp data is either sampled only when the indication is provided or the combination of the indication and clock positions is used to reference a lookup table containing timing offsets between the two clocks. In this manner, the system may order/align/process audio data with respect to the system clock with much better accuracy than would otherwise be possible in scenarios requiring sample rate conversion. In embodiments, the audio data may be rendered via speakers of the electronic device. Additionally, in embodiments, the audio data may be rendered as a component of a surround sound system.

Figure 5:
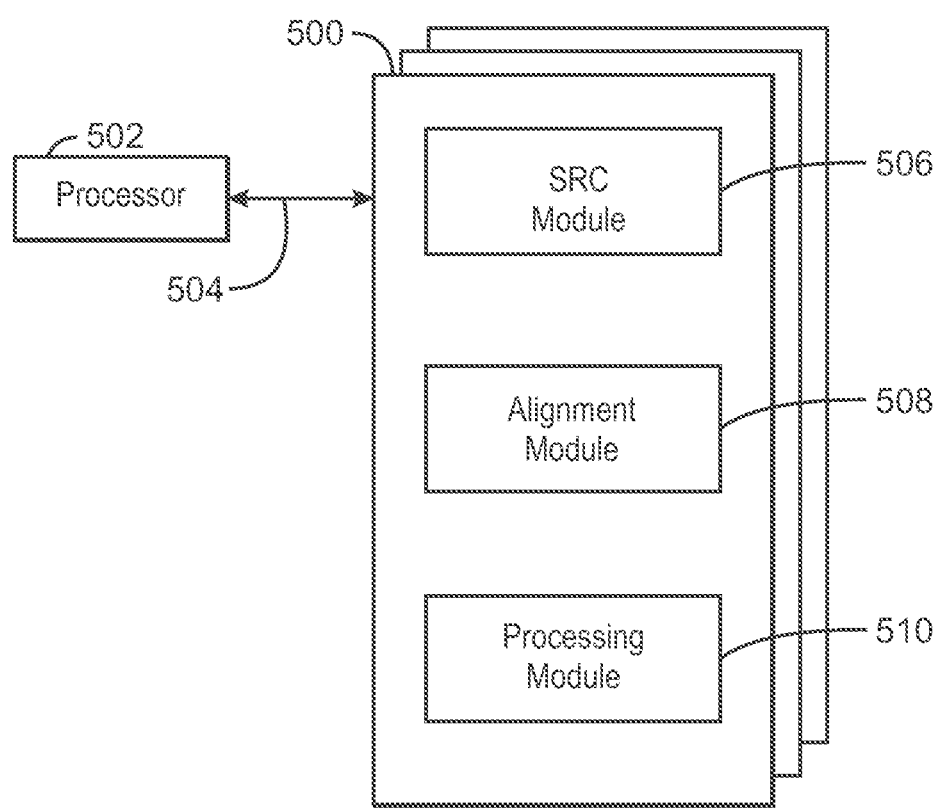
FIG. 5 is a block diagram showing media that enables accurate time aware audio stream.

FIG. 5 is a block diagram showing media 500 that enables accurate time aware audio stream. The media 500 may be a computer-readable medium, including a non-transitory medium that stores code that can be accessed by a processor 502 over a computer bus 504. For example, the computer-readable media 500 can be volatile or non-volatile data storage device. The media 500 can also be a logic unit, such as an Application Specific Integrated Circuit (ASIC), a Field Programmable Gate Array (FPGA), or an arrangement of logic gates implemented in one or more integrated circuits, for example.

The media 500 may include modules 506-510 configured to perform the techniques described herein. For example, a sample rate conversion (SRC) module 506 may be configured to perform a sample rate conversion. The sample rate conversion may be used to convert the frequency of the audio data to an integral multiple of the ADSP frequency. An alignment module 508 may be configured to indicate when the two clocks are aligned. In embodiments, the indication is a bit that is set whenever a first clock encompasses a second clock. Additionally, in embodiments, the ratio between the clocks or a pattern can be used to determine when the clocks will align to indicate when audio timing samples should occur.

A processing module 510 may be configured to process audio for a particular use. In embodiments, the audio data may be rendered via speakers of the electronic device. Additionally, in embodiments, the audio data may be rendered as a component of a surround sound system.

The block diagram of FIG. 5 is not intended to indicate that the media 500 is to include all of the components shown in FIG. 5. Further, the media 500 may include any number of additional components not shown in FIG. 5, depending on the details of the specific implementation.

Example 1 is an apparatus for accurate time aware audio streams. The apparatus includes a converter to perform sample rate conversion of data from a first clock to a second clock; and an alignment unit to indicate valid sample points in the data based on a relationship between the first clock and the second clock.

Example 2 includes the apparatus of example 1, including or excluding optional features. In this example, the relationship between the first clock and the second clock is a relative position of the first clock with regard to the second clock. Optionally, the indication is a bit that is set based on the relative position of the first clock with regard to the second clock.

Example 3 includes the apparatus of any one of examples 1 to 2, including or excluding optional features. In this example, the relationship between the first clock and the second clock is a ratio that is used to calculate when the first clock straddles the second clock. Optionally, the indication is a bit that is set based on clock edges that occur when the first clock straddles the second clock.

Example 4 includes the apparatus of any one of examples 1 to 3, including or excluding optional features. In this example, the relationship between the first clock and the second clock is a pattern.

Example 5 includes the apparatus of any one of examples 1 to 4, including or excluding optional features. In this example, the alignment unit is to set a bit that indicates the accuracy of the second clock.

Example 6 includes the apparatus of any one of examples 1 to 5, including or excluding optional features. In this example, the alignment unit eliminates timing uncertainty from the sample rate conversion.

Example 7 includes the apparatus of any one of examples 1 to 6, including or excluding optional features. In this example, the alignment unit is to enable accurate sample rate conversion when the first clock and the second clock are not related by an integer ratio.

Example 8 includes the apparatus of any one of examples 1 to 7, including or excluding optional features. In this example, sampling points based on the relationship between the first clock and the second clock is to correlate a plurality of audio frames and hardware clocks to within a small fraction of a larger clock cycle of the first clock and the second clock.

Example 9 is a method for accurate time aware audio streams. The method includes determining a relationship between a first clock and a second clock; providing an indication when the first clock straddles the second clock; and sampling data when the indicator is provided.

Example 10 includes the method of example 9, including or excluding optional features. In this example, the relationship between the first clock and the second clock is a relative position of the first clock with regard to the second clock. Optionally, the indication is a bit that is set based on the relative position of the first clock with regard to the second clock.

Example 11 includes the method of any one of examples 9 to 10, including or excluding optional features. In this example, the relationship between the first clock and the second clock is a ratio that is used to calculate when the first clock straddles the second clock. Optionally, the indication is a bit that is set based on the ratio that is used to calculate when the first clock straddles the second clock.

Example 12 includes the method of any one of examples 9 to 11, including or excluding optional features. In this example, the relationship between the first clock and the second clock is a pattern. Optionally, an offset at every first clock edge in the pattern is pre-calculated and stored in a lookup table, and the lookup table is used to determine when the first clock straddles the second clock.

Example 13 includes the method of any one of examples 9 to 12, including or excluding optional features. In this example, the indication is to eliminate timing uncertainty from the sample rate conversion.

Example 14 includes the method of any one of examples 9 to 13, including or excluding optional features. In this example, the indication is to enable accurate sample rate conversion when the first clock and the second clock are not related by an integer ratio.

Example 15 includes the method of any one of examples 9 to 14, including or excluding optional features. In this example, sampling data when the indicator is provided is to correlate audio frames and hardware clocks to within one system clock.

Example 16 includes the method of any one of examples 9 to 15, including or excluding optional features. In this example, when the first clock straddles the second clock a period of the first clock is to encompass two clock edges of the second clock.

Example 17 includes the method of any one of examples 9 to 16, including or excluding optional features. In this example, the first clock is an audio digital signal processor and the second clock is a CODEC clock.

Example 18 is a system for accurate time aware audio streams. The system includes a memory configured to receive data; and a processor coupled to the memory, the processor to: determine a relationship between a first clock and a second clock; provide an indication when the first clock straddles the second clock; and sample the data when the indicator is provided.

Example 19 includes the system of example 18, including or excluding optional features. In this example, the relationship between the first clock and the second clock is a relative position of the first clock with regard to the second clock. Optionally, the indication is a bit that is set based on the relative position of the first clock with regard to the second clock.

Example 20 includes the system of any one of examples 18 to 19, including or excluding optional features. In this example, the relationship between the first clock and the second clock is a ratio that is used to calculate when the first clock straddles the second clock. Optionally, the indication is a bit that is set based on the ratio that is used to calculate when the first clock straddles the second clock.

Example 21 includes the system of any one of examples 18 to 20, including or excluding optional features. In this example, the relationship between the first clock and the second clock is a pattern. Optionally, an offset at every first clock edge in the pattern is pre-calculated and stored in a lookup table, and the lookup table is used to determine when the first clock straddles the second clock.

Example 22 includes the system of any one of examples 18 to 21, including or excluding optional features. In this example, the indication is to eliminate timing uncertainty from the sample rate conversion.

Example 23 includes the system of any one of examples 18 to 22, including or excluding optional features. In this example, the indication is to enable accurate sample rate conversion when the first clock and the second clock are not related by an integer ratio.

Example 24 includes the system of any one of examples 18 to 23, including or excluding optional features. In this example, sampling data when the indicator is provided is to correlate audio frames and hardware clocks to within one system clock.

Example 25 includes the system of any one of examples 18 to 24, including or excluding optional features. In this example, when the first clock straddles the second clock a period of the first clock is to encompass two clock edges of the second clock.

Example 26 includes the system of any one of examples 18 to 25, including or excluding optional features. In this example, the first clock is an audio digital signal processor and the second clock is a CODEC clock.

Example 27 is an apparatus for accurate time aware audio streams. The apparatus includes a converter to perform sample rate conversion of data from a first clock to a second clock; and a means to indicate valid sample points in the data based on a relationship between the first clock and the second clock.

Example 28 includes the apparatus of example 27, including or excluding optional features. In this example, the relationship between the first clock and the second clock is a relative position of the first clock with regard to the second clock. Optionally, the indication is a bit that is set based on the relative position of the first clock with regard to the second clock.

Example 29 includes the apparatus of any one of examples 27 to 28, including or excluding optional features. In this example, the relationship between the first clock and the second clock is a ratio that is used to calculate when the first clock straddles the second clock. Optionally, on clock edges that occur when the first clock straddles the second clock.

Example 30 includes the apparatus of any one of examples 27 to 29, including or excluding optional features. In this example, the relationship between the first clock and the second clock is a pattern.

Example 31 includes the apparatus of any one of examples 27 to 30, including or excluding optional features. In this example, the means to indicate valid sample points is to set a bit that indicates the accuracy of the second clock.

Example 32 includes the apparatus of any one of examples 27 to 31, including or excluding optional features.

In this example, the means to indicate valid sample points eliminates timing uncertainty from the sample rate conversion.

Example 33 includes the apparatus of any one of examples 27 to 32, including or excluding optional features. In this example, the means to indicate valid sample points is to enable accurate sample rate conversion when the first clock and the second clock are not related by an integer ratio.

Example 34 includes the apparatus of any one of examples 27 to 33, including or excluding optional features. In this example, sampling points based on the relationship between the first clock and the second clock is to correlate a plurality of audio frames and hardware clocks to within a small fraction of a larger clock cycle of the first clock and the second clock.

Example 35 is a tangible, non-transitory, computer-readable medium. The computer-readable medium includes instructions that direct the processor to determine a relationship between a first clock and a second clock; provide an indication when the first clock straddles the second clock; and sample data when the indicator is provided.

Example 36 includes the computer-readable medium of example 35, including or excluding optional features. In this example, the relationship between the first clock and the second clock is a relative position of the first clock with regard to the second clock. Optionally, the indication is a bit that is set based on the relative position of the first clock with regard to the second clock.

Example 37 includes the computer-readable medium of any one of examples 35 to 36, including or excluding optional features. In this example, the relationship between the first clock and the second clock is a ratio that is used to calculate when the first clock straddles the second clock. Optionally, the indication is a bit that is set based on the ratio that is used to calculate when the first clock straddles the second clock.

Example 38 includes the computer-readable medium of any one of examples 35 to 37, including or excluding optional features. In this example, the relationship between the first clock and the second clock is a pattern. Optionally, an offset at every first clock edge in the pattern is pre-calculated and stored in a lookup table, and the lookup table is used to determine when the first clock straddles the second clock.

Example 39 includes the computer-readable medium of any one of examples 35 to 38, including or excluding optional features. In this example, the indication is to eliminate timing uncertainty from the sample rate conversion.

Example 40 includes the computer-readable medium of any one of examples 35 to 39, including or excluding optional features. In this example, the indication is to enable accurate sample rate conversion when the first clock and the second clock are not related by an integer ratio.

Example 41 includes the computer-readable medium of any one of examples 35 to 40, including or excluding optional features. In this example, sampling data when the indicator is provided is to correlate audio frames and hardware clocks to within one system clock.

Example 42 includes the computer-readable medium of any one of examples 35 to 41, including or excluding optional features. In this example, when the first clock straddles the second clock a period of the first clock is to encompass two clock edges of the second clock.

Example 43 includes the computer-readable medium of any one of examples 35 to 42, including or excluding optional features. In this example, the first clock is an audio digital signal processor and the second clock is a CODEC clock. It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for accurate time aware audio streams, comprising:
   a converter to perform sample rate conversion of data from a first clock to a second clock; and
   an alignment unit to indicate valid sample points in the data based on a relationship between the first clock and the second clock, wherein the alignment unit pre-calculates the relationship as a repeating pattern of clock edge alignment.

2. The apparatus of claim 1, wherein the relationship between the first clock and the second clock is a relative position of the first clock with regard to the second clock, and the alignment unit outputs a bit that is set to indicate at least one valid sample point based on the relative position of the first clock with regard to the second clock.

3. The apparatus of claim 1, wherein the relationship between the first clock and the second clock further comprises a ratio that is used to calculate when the first clock straddles the second clock, and the alignment unit outputs a bit that is set to indicate at least one valid sample point based on clock edges that occur when the first clock straddles the second clock.

4. The apparatus of claim 1, wherein the first clock operates at a frequency of 44.1 kHz and the second clock operates at a frequency of 48 kHz and the clock edge alignment between a clock edge of the first clock and a clock edge of the second clock repeats every 160 clocks of the second clock.

5. The apparatus of claim 1, wherein the alignment unit is to set a bit that indicates the accuracy of the second clock.

6. The apparatus of claim 1, wherein the alignment unit eliminates timing uncertainty from the sample rate conversion.

7. The apparatus of claim 1, wherein the alignment unit is to enable accurate timing calculations when the first clock and the second clock are not related by an integer ratio.

8. The apparatus of claim 1, wherein sampling points based on the relationship between the first clock and the second clock is to correlate a plurality of audio frames and hardware clocks to within a small fraction of a larger clock cycle of the first clock and the second clock.

9. A method for accurate time aware audio streams, comprising:
   pre-calculating a repeating pattern of clock edge alignment describing a relationship between a first clock and a second clock, wherein the first clock corresponds to a CODEC sample rate and the second clock is a system clock;
   providing an indication when the first clock straddles the second clock according to the relationship; and
   sampling data when the indication is provided.

10. The method of claim 9, wherein the relationship between the first clock and the second clock is a relative position of the first clock with regard to the second clock.

11. The method of claim 9, wherein the relationship between the first clock and the second clock further comprises a ratio that is used to calculate when the first clock straddles the second clock.

12. The method of claim 9, wherein the first clock operates at a frequency of 44.1 kHz and the second clock operates at a frequency of 48 kHz and the clock edge alignment between a clock edge of the first clock and a clock edge of the second clock repeats every 160 clocks of the second clock.

13. The method of claim 9, wherein an offset at every first clock edge in a pattern is pre-calculated and stored in a lookup table, and the lookup table is used to determine the timing offset of the second clock relative to the first clock at every point in the repeating pattern.

14. The method of claim 9, wherein the indication is to eliminate timing uncertainty from the sample rate conversion.

15. The method of claim 9, wherein the indication is to enable accurate sample rate conversion when the first clock and the second clock are not related by an integer ratio.

16. The method of claim 9, wherein sampling timing data when the indication is provided is to correlate audio frames and hardware clocks to within one system clock.

17. A system for accurate time aware audio streams, comprising:
   a memory configured to receive data; and
   a processor coupled to the memory, the processor to:
      pre-calculate a repeating pattern of clock edge alignment describing a relationship between a first clock and a second clock;
      provide an indication when the first clock straddles the second clock according to the relationship; and
      sample data when the indication is provided.

18. The system of claim 17, wherein the relationship between the first clock and the second clock is a relative position of the first clock with regard to the second clock, and the indication is a bit that is set based on the relative position of the first clock with regard to the second clock.

19. The system of claim 17, wherein the relationship between the first clock and the second clock further comprises a ratio that is used to calculate when the first clock straddles the second clock, and the indication is a bit that is set based on the ratio that is used to calculate when the first clock straddles the second clock.

20. The system of claim 17, wherein an offset at every first clock edge in the pattern is pre-calculated and stored in a lookup table, and the lookup table is used to determine when the first clock straddles the second clock.

21. At least one non-transitory computer readable medium comprising a plurality of instructions that, in response to being executed on a computing device, cause the computing device to:
   pre-calculate a repeating pattern of clock edge alignment describing a relationship between a first clock and a second clock;
   provide an indication when the first clock straddles the second clock according to the relationship; and
   sample data when the indication is provided.

22. The at least one non-transitory computer readable medium of claim 21, wherein the indication is to enable accurate timing data sampling when the first clock and the second clock are not related by an integer ratio.

23. The at least one non-transitory computer readable medium of claim 21, wherein sampling data when the indication is provided is to correlate audio frames and hardware clocks to within one system clock.

24. The at least one non-transitory computer readable medium of claim 21, wherein the indication is to eliminate timing uncertainty from the sample rate conversion.

25. The at least one non-transitory computer readable medium of claim 21, wherein the first clock corresponds to an audio digital signal processor and the second clock corresponds to an audio stream frequency.

\* \* \* \* \*